(No Model.)

J. H. SCHAAL.
FILE CUTTING MACHINE.

No. 250,171. Patented Nov. 29, 1881.

WITNESSES.
W. A. Bertram
A. H. Barclay

INVENTOR
John H. Schaal.
BY
R. D. Williams
ATTORNEY.

UNITED STATES PATENT OFFICE.

JOHN H. SCHAAL, OF BALTIMORE, MARYLAND, ASSIGNOR TO THE UNION FILE WORKS, OF SAME PLACE.

FILE-CUTTING MACHINE.

SPECIFICATION forming part of Letters Patent No. 250,171, dated November 29, 1881.

Application filed May 11, 1881. (No model.)

*To all whom it may concern:*

Be it known that I, JOHN H. SCHAAL, of Baltimore city, State of Maryland, have invented certain new and useful Improvements in File-Cutting Machines; and I hereby declare the same to be fully, clearly, and exactly described as follows, reference being had to the accompanying drawings, in which—

Figure 1:
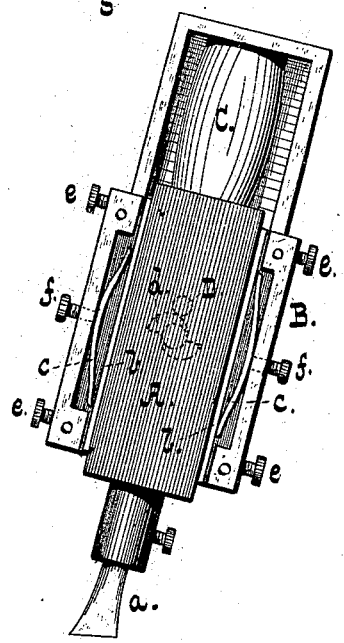
Figure 2:
Figure 3:

Figure 1 is a side elevation of that part of a file-cutter to which my invention relates. Fig. 2 is a sectional view, showing on an enlarged scale the outline of tooth cut by my improved device; and Fig. 3 is a similar view of the ordinary machine-cut tooth.

My invention relates to file-cutting machines in general, and to that class of the same in particular in which a chisel-holder is arranged to reciprocate in an inclined or vertical position between suitable guides and delivers the blow upon the file-blank which rests on a suitable feed-carriage. In these machines a continuous feed is a practical necessity, as the ratchet-feed is slow, and when wear occurs, which it necessarily does sooner or later, the work is certain to be uneven and unsatisfactory. The continuous feed is the source of a serious evil, more than outweighed, however, by its advantages, but which evil it is the design of my invention to obviate. It is due to the fact that while the chisel is entering and leaving the blank the latter is moving forward. As a result the crowns of the teeth are burred backward, as shown in Fig. 3, causing the file to cut, as it were, on both the forward and backward strokes, the teeth being of such shape that they rapidly wear away. To this fact and feature is due the acknowledged superiority of the hand-cut over the machine-made file. In the former the teeth have substantially plane faces, as shown in Fig. 2, and the file makes a true cut on the forward stroke, in contradistinction to a scrape, and does not cut on the return-stroke. The teeth have the form shown because of the fact that the chisel, being held in the hand, will yield and has no tendency to turn over the sides of the teeth. I have succeeded in making a machine-made file only distinguishable from the hand-made by the perfect regularity of the teeth, and this desirable end I attain by a simple device readily applicable to the well-known file-machines in use.

In the drawings I have considered it necessary to show only that part of the machine to which my invention relates.

A is the plunger to which the chisel $a$ is secured, and which reciprocates in a casing, B. The side plate of the latter is removed to show its internal construction. The plunger is normally driven downward by means of a spring, C, but is carried upward against the resistance of the spring by a cam, $d$, that turns against a pin, D, secured to the plunger. As the cam passes the pin the latter is released and the spring C drives the plunger downward, delivering a blow upon the file-blank.

The parts described are all of the old and well-known construction. On either side of the plunger is a guide-plate, $b$, between which the plunger slides, which plates are pressed against the plunger by means of springs $c$, whose tension may be regulated by set-screws $f$. Other set-screws, $e$ $e$, in the ends of the casing serve to limit the play of the plates $b$ $b$.

Such is the construction of the device. In operation the plunger is raised and driven down as described; and while the tension of the springs is sufficient to insure a true rightline blow of the chisel, the entire plunger is susceptible of a slight vibration in a plane parallel to the feed. As a result the advance of the file-blank during the instant of rest subsequent to the cutting of a tooth simply causes the chisel to tilt backward in the line of feed, and the crown of the tooth is not burred backward, as it would inevitably be were the plunger not susceptible of the tilting motion. The chisel descends with such lightning-like rapidity that the blank may be considered as stationary during the entrance of the chisel. The tilting of the chisel by the advancing file-blank is effected against the resistance of the lower end of the spring on the under side of the plunger, and of the upper end of the other spring. As soon as the cam has raised the chisel clear of the blank the reaction of the springs restores the plunger to its normal position within the casing.

The device is readily applicable to the well-known file-cutters—the "Weed," for instance—by simply planing off the faces of the plunger and applying the plates and springs. Its use results in the production of a perfect file. The wear of the machine and chisels is greatly lessened and due to the peculiar character of the blow. The machine works without the deafening racket characteristic of the ordinary machines.

I do not limit myself to the precise form of device shown, as the same may be modified in many ways without departing from the spirit of my invention. Spiral springs, for instance, may be substituted for the leaf-springs, or a single spring may be used, or other mechanism may be adopted for admitting of a tilting motion on the part of the plunger.

What I claim is—

1. In a file-cutting machine, a reciprocating chisel-holder or plunger having a slight yielding play within its guides in the plane of the advance of the file-blank, a spring for effecting the blow of the chisel upon the blank, and mechanism for lifting the plunger after each stroke, substantially as set forth.

2. In combination with the casing and spring C, the plunger A, having a yielding play in the plane of the advance of the file-blank, and the cam $d$, substantially as described.

3. In combination with the casing and reciprocating plunger, the springs $c$, guide-plates $b$, and set-screws $e f$, as set forth.

JOHN H. SCHAAL.

Witnesses:
R. D. WILLIAMS,
JNO. T. MADDOX.